US006724989B1

(12) United States Patent
Lin et al.

(10) Patent No.: US 6,724,989 B1
(45) Date of Patent: Apr. 20, 2004

(54) CAMERA STROBE RECHARGING INTEGRATED CIRCUIT

(75) Inventors: Ching-Kun Lin, Hsinchu (TW); Yung-Chih Chen, Pingtung (TW); Tien-Tzu Chen, Kaohsiung (TW)

(73) Assignee: Aimtron Technology Corp., Hsinchu (TW)

(*) Notice: Subject to any disclaimer, the term of this patent is extended or adjusted under 35 U.S.C. 154(b) by 0 days.

(21) Appl. No.: 10/414,029

(22) Filed: Apr. 16, 2003

(30) Foreign Application Priority Data

Dec. 9, 2002 (TW) ....................................... 91136628 A

(51) Int. Cl.[7] ................................................ G03B 7/26

(52) U.S. Cl. ................. 396/206; 315/241 P; 315/241 S

(58) Field of Search ................................ 396/206, 205, 396/201; 315/241 P, 241 S, 238, 241 R, 227 R, 136, 107, 101, 291, 307; 320/166

(56) References Cited

U.S. PATENT DOCUMENTS 4,464,608 A * 8/1984 Pilley ..................... 315/241 P
4,587,463 A * 5/1986 Allington .................... 315/307
4,688,099 A * 8/1987 Funston ........................ 348/96
6,316,882 B1 * 11/2001 Choi et al. .................. 315/225
6,504,315 B2 * 1/2003 Kim ........................... 315/224
2002/0109471 A1 * 8/2002 Adams et al. .............. 315/363

* cited by examiner

*Primary Examiner*—Russell Adams
*Assistant Examiner*—Rochelle Blackman
(74) *Attorney, Agent, or Firm*—Bacon & Thomas, PLLC

(57) ABSTRACT

A camera strobe recharging IC includes a one-shot unit, an R-S latch block unit, a PWM control unit, and a ready control unit. The one-shot unit provides square wave signals. The R-S latch block unit is electrically connected with the one-shot unit. The PWM control unit includes a reference voltage source, an oscillator, a PWM comparator, a voltage boost comparator, and a current source. The ready control unit includes an FET, which has a gate contact electrically connected with an output contact of the R-S latch block unit. Accordingly, the present invention is compact and structurally tiny to facilitate integration and is good at modulating charging current, accelerating charging, and automatically recharging.

2 Claims, 2 Drawing Sheets

CAMERA STROBE RECHARGING INTEGRATED CIRCUIT

BACKGROUND OF THE INVENTION

1. Field of the Invention

The present invention relates generally to strobes, and more particularly to a camera strobe recharging integrated circuit (IC).

2. Description of the Related Art

A conventional camera strobe recharging circuit is regularly composed of a plurality of scattered electronic component parts, such as capacitors, transistors, resistors, and so on, such that the conventional camera strobe recharging circuit is structurally huge and further costs a great amount of time and money while being assembled. In addition, the conventional camera strobe recharging circuit is subject to generate large inrush current, which may damage camera batteries, and takes a long time to complete the recharging of electrical energy.

SUMMARY OF THE INVENTION

It is the primary objective of the present invention to provide a camera strobe recharging IC, which generates low inrush current and takes less time to complete recharging process.

It is another objective of the present invention to provide a camera strobe recharging IC, which controls and prevents the current from damaging camera batteries.

It is still another objective of the present invention to provide a camera strobe recharging IC, which is structurally tiny and is preferably compact for installation.

The foregoing objectives of the present invention are attained by the camera strobe recharging IC, which is composed of a one-shot unit, an R-S latch block unit, a pulse width modulation (PWM) control unit, and a ready control unit. The one-shot unit is embodied as a squaring circuit providing square wave signals. The R-S latch block unit includes a set contact electrically connected with the one-shot unit, a reset contact, and at least one output contact having outputted level controlled by signals of the set contact and the reset contact to keep in output condition. The PWM control unit includes a reference voltage source, an oscillator, a PWM comparator, a voltage boost comparator, and a power source. The reference voltage source provides referential voltage. The PWM comparator includes a first input contact electrically connected with the oscillator, a second input contact electrically connected with a reference voltage-divider unit modulating to set up the maximum pulse width, and a third input contact electrically connected with the output contact via an inverter and a field effect transistor (FET). The current source is also electrically connected with the third input contact of the PWM comparator. The voltage rise comparator is electrically connected with the reset contact of the R-S latch block unit at an output contact thereof. The ready control unit includes an FET, which has a drain contact electrically connected with the output contact of the R-S latch block unit.

DETAILED DESCRIPTION OF THE INVENTION

Figure 1:
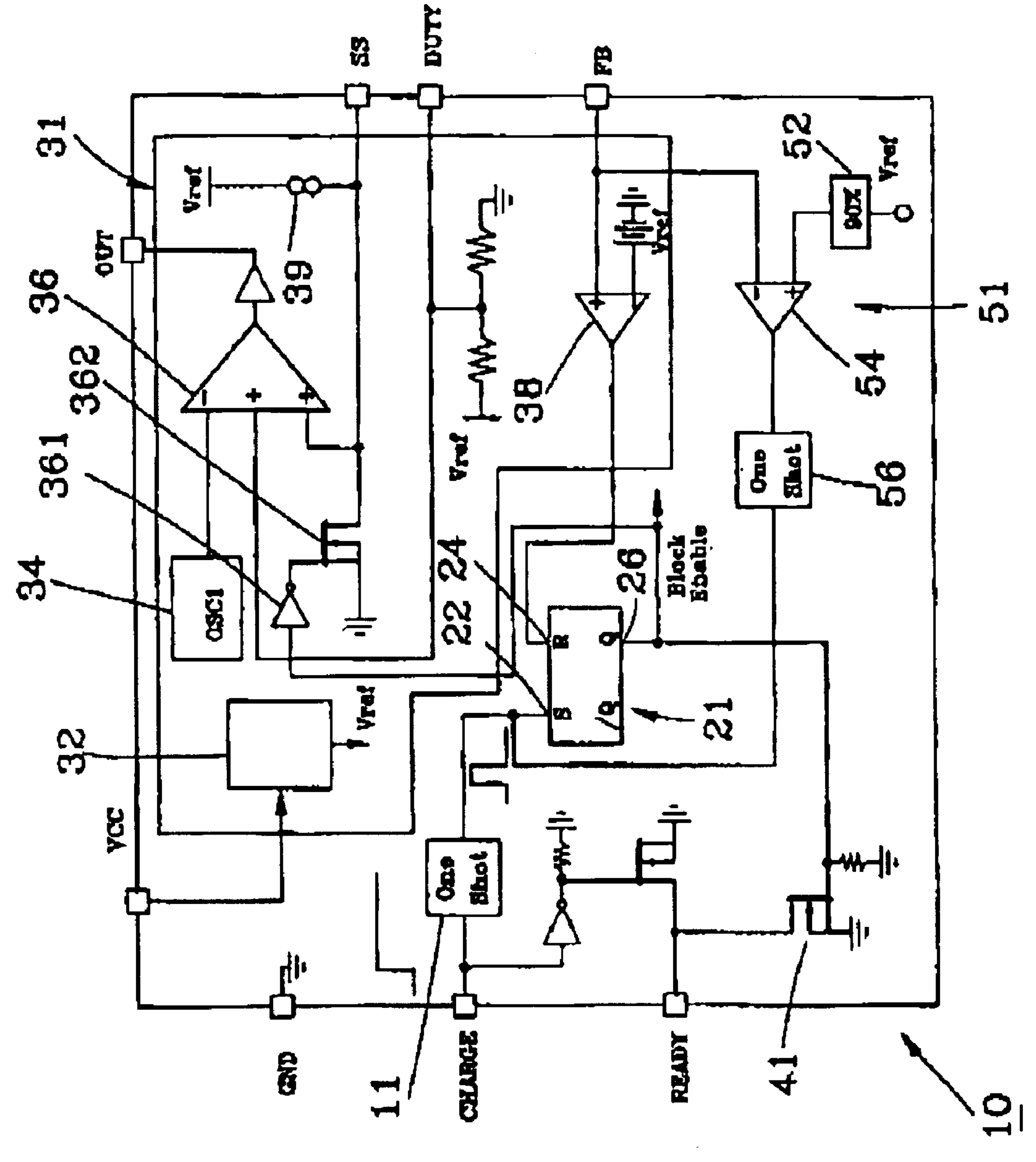
FIG. 1 is a schematic diagram of a preferred embodiment of the present invention.

Referring to FIG. 1, a camera strobe recharging IC 10 in accordance with a preferred embodiment of the present invention is adapted for a camera (not shown). The camera strobe recharging IC 10 is composed of a one-shot unit 11, an R-S latch block unit 21, a PWM control unit 31, a ready control unit 41, and a refresh circuit 51.

The one-shot unit 11 is embodied as a squaring circuit providing square wave signals.

The R-S latch block unit 21 includes a set contact 22, a reset contact 24, and at least one output contact (Q) 26. The set contact 22 is electrically connected with the one-shot unit 11. Output level of the output contact (Q) 26 is controlled by signals generated by the set contact 22 and the reset contact 24 to keep in an output condition.

The PWM control unit 31 includes a reference voltage source 32, an oscillator 34, a PWM comparator 36, a voltage boost comparator 38, and a current source 39. The reference voltage source 32 is to provide referential voltage. The PWM comparator 36 has a first input contact (−) electrically connected with the oscillator 34, a second input contact (+) electrically connected with a reference voltage-divider unit 42 capable of modulating the maximum pulse width, and a third input contact (+) electrically connected with the output contact (Q) 26 of the R-S latch block unit 21 via an inverter 361 and an FET (field effect transistor) 362. The third input contact (+) is further electrically connected with a connector socket (SS) adapted to connect a capacitor (not shown) for controlling whether the PWM control unit 31 is activated and the pulses width transforming from small to large. The current source 39 is also electrically connected with the third input contact (+) of the PWM comparator 36. The voltage boost comparator 38 is electrically connected with the reset contact 24 of the R-S block unit 21 at an output contact thereof.

The ready control unit 41 includes an FET, which has a gate contact electrically connected with the output contact (Q) 26 of the R-S latch block unit 21 and a drain contact acted as an output contact for connecting a ready lamp (not shown) of the camera (not shown).

The refresh circuit 51 includes a voltage-divider unit 52 electrically connected with the reference voltage source 32 and outputting 90% voltage of the reference voltage source 32, i.e. the output voltage of the voltage-divider unit 52 is lower than a predetermined voltage. The voltage-divider unit 52 is further electrically connected with a one-shot unit 56 via a comparator 54, wherein the one-shot unit 56 is electrically connected with the set contact 22 of the R-S latch block unit 21.

While the present invention mounted in the camera (not shown) is in use, the camera strobe recharging IC 10 will be activated by turning on a camera strobe (not shown) if necessary according to a user's judgement or photosensitive components of the camera (not shown). While the one-shot unit 11 receives a signal of switching from a LOW phase to a HIGH phase and then sends a square-wave with a suitable pulse width to enable the R-S latch block unit 21 in set condition, the output contact (Q) 26 of the R-S latch block unit 21 sends a HIGH-signal to activate the PWM control unit 31. In the meantime, the ready control unit 41 is in LOW output condition. In other words, the ready lamp of the camera will not work while the drain contact (output contact) of the ready control unit 41 is electrically connected to the ready lamp.

Figure 2:
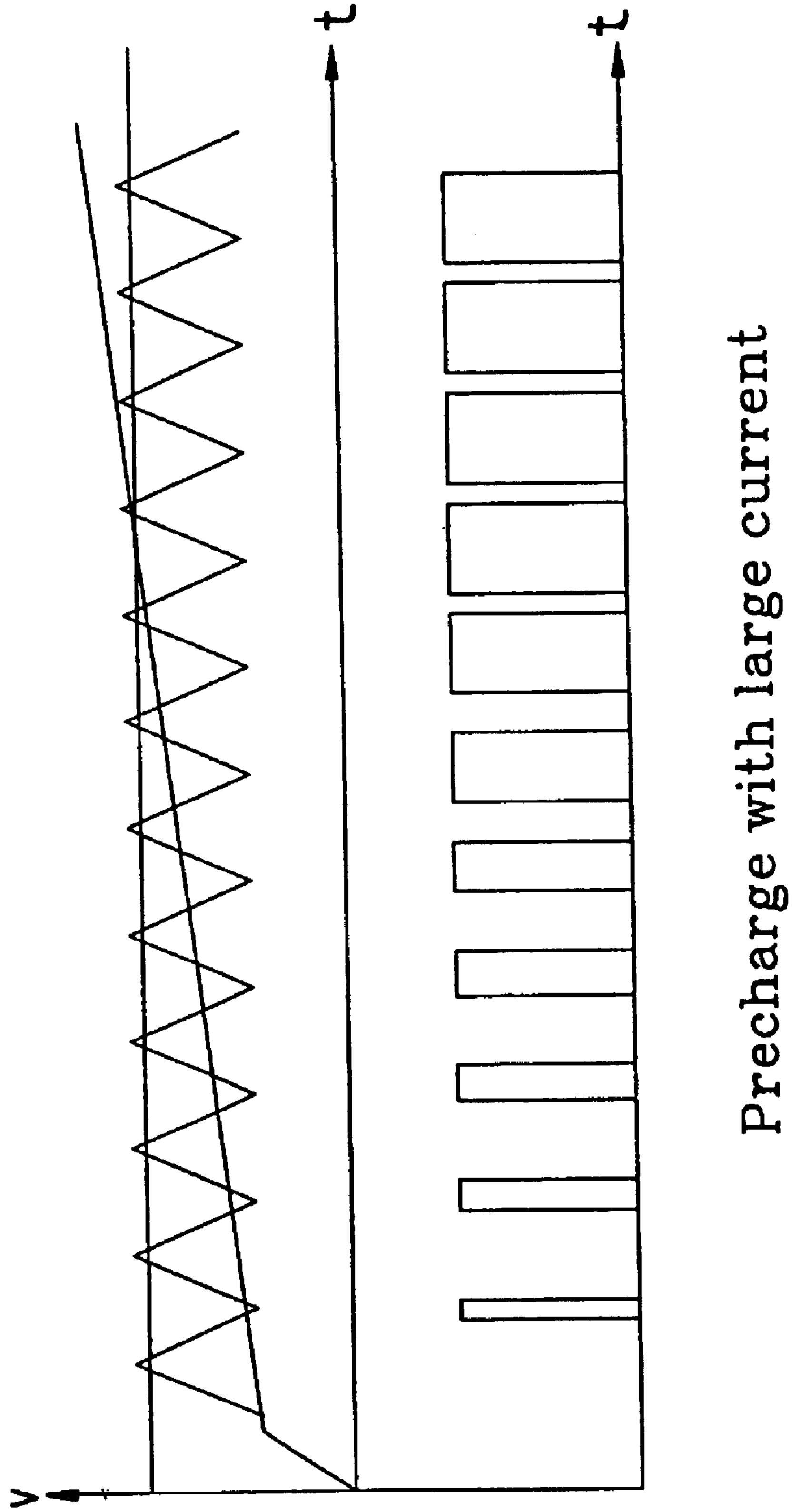
FIG. 2 is a relative diagram of the preferred embodiment of the present invention, showing how the present invention works.

As shown in FIG. 2, while the PWM control unit 31 is initiated to work, the capacitor (not shown) connected to the connector socket (SS) in connection with the third input contact (+) of the PWM comparator 36 is rapidly electrically charged at first until a trough of a triangular wave outputted by the oscillator 34 is reached. After the trough of the triangular wave is reached, switch to charge the current source (1 uA) 39. Accordingly, the PWM control unit 31 is initiated to output at the beginning and capacitors (not shown) of the camera strobe (not shown) starts to be charged, thereby charging the capacitors (not shown) of the camera strobe (not shown) in a short time. While the voltage boost comparator 38 compares the voltage of the capacitors (not shown) of the camera strobe (not shown) with the referential voltage provided by the reference voltage source 32 so as to learn that the voltage of the capacitors (not shown) of the camera strobe (not shown) rises to the predetermined voltage, the voltage boost comparator 38 outputs a HIGH-signal, the R-S latch block unit is in reset condition, the output contact (Q) 26 outputs a LOW-signal, the PWM control unit 31 is closed, and the ready control unit outputs a HIGH-signal, such that the charging process is completed.

If the camera strobe (not shown) is kept turned off, the capacitors (not shown) of the camera strobe (not shown) will keep leaking current slowly and then the voltage thereof will keep lowering slowly. Once lowering to a low voltage, like 90% of the predetermined voltage, the comparator 54 of the refresh circuit 51 will detect the above condition by the voltage-divider unit 52 and the reference voltage source 32 to output a HIGH-signal. At the same time, the one-shot unit 56 will send a square-wave with suitable width so as to put the R-S latch block unit 21 in set condition and to further activate the PWM control unit 31 for recharging.

When the camera strobe (not shown) is turned on to work after completing charging, the capacitors (not shown) of the camera strobe (not shown) will be rapidly discharged. In the meantime, the voltage of the capacitors (not shown) is much lower than the predetermined voltage, thereby activating the PWM control unit 31 once again to repeat the aforementioned charging process.

In conclusion, the present invention includes advantages as follows:

1. The PWM control unit is activated to work at the beginning such that the camera strobe can be charged completely in a short time and then the strobe can be activated to work again.
2. By means of the PWM control unit, the camera strobe is charged increasingly to avoid inrush current, thereby preventing camera batteries from damage and further prolonging the durability of the camera batteries.
3. The present invention has scattered components of the camera integrated into an IC chip such that the camera strobe recharging IC is structurally tiny and is preferably compact for installation.
4. The present invention can detect voltage deficiency generated by the leakage current of the capacitors so as to automatically recharge the capacitors up to the predetermined voltage.

What is claimed is:

1. A camera strobe recharging integrated circuit (IC) comprising:

a one-shot unit defining a squaring circuit providing square wave signals;

an R-S latch block unit having a set contact, a reset contact, and at least one output contact, said set contact being electrically connected with said one-shot unit, output level of said output contact being controlled to keep in output condition by signals generated by said set contact and said reset contact;

a pulse width modulation (PWM) control unit including a reference voltage source, an oscillator, a PWM comparator, a voltage boost comparator, and a power source, said reference voltage source offering referential voltage, said PWM comparator having a first input contact electrically connected with said oscillator, a second input contact electrically connected with a reference voltage-divider unit, and a third input contact electrically connected with said R-S latch block unit via an inverter and a field effect transistor (FET), said power source being electrically connected with said third input contact of said PWM comparator, said voltage boost comparator with an output contact electrically connected with said reset contact of said R-S latch block unit; and a ready control unit including an FET, said FET having a source contact electrically connected with said output contact of said R-S latch block unit.

2. The camera strobe recharging IC as defined in claim 1 further comprising a refresh circuit, said refresh circuit having a voltage-divider unit electrically connected with said reference voltage source, said voltage-divider unit being electrically connected with a one-shot unit via a comparator and outputting lower voltage than the referential voltage provided by said reference voltage source, said one-shot unit being electrically connected with said set contact of said R-S latch block unit.

* * * * *